(12) United States Patent
Nandi et al.

(10) Patent No.: US 10,193,138 B2
(45) Date of Patent: *Jan. 29, 2019

(54) GLASS-FIBER CONTAINING COMPOSITE MATERIALS FOR ALKALI METAL-BASED BATTERIES AND METHODS OF MAKING

(71) Applicant: JOHNS MANVILLE, Denver, CO (US)

(72) Inventors: Souvik Nandi, Highlands Ranch, CO (US); Alan Michael Jaffee, Bowling Green, OH (US); Kristin Franz Goya Obernyer, Denver, CO (US); Albert G Dietz, III, Davidson, NC (US)

(73) Assignee: Johns Manville, Denver, CO (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/699,161

(22) Filed: Apr. 29, 2015

(65) Prior Publication Data

US 2015/0236338 A1 Aug. 20, 2015

Related U.S. Application Data

(63) Continuation-in-part of application No. 12/980,905, filed on Dec. 29, 2010, now Pat. No. 9,065,117.

(60) Provisional application No. 61/295,120, filed on Jan. 14, 2010.

(51) Int. Cl.
| | |
|---|---|
| *H01M 4/1397* | (2010.01) |
| *H01M 4/04* | (2006.01) |
| *D04H 3/004* | (2012.01) |
| *D06M 11/38* | (2006.01) |
| *H01M 10/0562* | (2010.01) |
| *H01M 10/0525* | (2010.01) |
| *H01M 4/136* | (2010.01) |
| *H01M 4/36* | (2006.01) |

(52) U.S. Cl.
CPC ............ *H01M 4/136* (2013.01); *D04H 3/004* (2013.01); *D06M 11/38* (2013.01); *H01M 4/0402* (2013.01); *H01M 4/1397* (2013.01); *H01M 4/362* (2013.01); *H01M 10/0525* (2013.01); *H01M 10/0562* (2013.01); *H01M 2220/20* (2013.01); *H01M 2300/008* (2013.01); *Y10T 442/2992* (2015.04)

(58) Field of Classification Search
CPC . C03C 13/00; H01M 10/0525; H01M 10/054; H01M 10/0565; H01M 2004/028; H01M 2/1653; H01M 4/136; H01M 4/362; H01M 4/582; H01M 4/5825; Y02E 60/122

See application file for complete search history.

(56) References Cited

U.S. PATENT DOCUMENTS

| | | | |
|---|---|---|---|
| 6,511,774 B1 | 1/2003 | Tsukuda et al. | |
| 6,551,746 B1 * | 4/2003 | Vitins | H01M 4/131 429/218.1 |
| 9,065,117 B2 * | 6/2015 | Nandi | C03C 13/00 |
| 9,269,947 B2 * | 2/2016 | Nandi | C03C 13/00 |
| 2003/0008214 A1 | 1/2003 | Zguris | |
| 2006/0204856 A1 | 9/2006 | Ryu et al. | |
| 2008/0116423 A1 * | 5/2008 | Fan | H01B 1/122 252/502 |
| 2008/0153002 A1 | 6/2008 | Nazar et al. | |
| 2015/0064574 A1 * | 3/2015 | He | H01M 10/0568 429/300 |

\* cited by examiner

*Primary Examiner* — Barbara L Gilliam
*Assistant Examiner* — Adam A Arciero
(74) *Attorney, Agent, or Firm* — Robert D. Touslee

(57) ABSTRACT

Glass-fiber composites are described that include a substrate containing glass fibers and particles in contact with the glass fiber substrate. The particles may include an alkali-metal containing compound. In addition, batteries are described with an anode, a cathode, and an electrolyte. The cathode may include alkali-metal containing nanoparticles in contact with glass fibers. Also describe are methods of making a glass-fiber composite. The methods may include the steps of forming a wet laid non-woven glass fiber substrate, and contacting alkali-metal containing particles on the substrate.

21 Claims, No Drawings

GLASS-FIBER CONTAINING COMPOSITE MATERIALS FOR ALKALI METAL-BASED BATTERIES AND METHODS OF MAKING

CROSS-REFERENCE TO RELATED APPLICATIONS

This application is a continuation-in-part of and claims the benefit of priority to U.S. Nonprovisional patent application Ser. No. 12/980,905 filed Dec. 29, 2010, which claims the benefit of priority to U.S. Provisional Patent Application No. 61/295,120, filed on Jan. 14, 2010. The entire content of each of the above filings is hereby incorporated by reference for all purposes.

BACKGROUND OF THE INVENTION

Lithium-ion batteries have gained widespread adoption in portable electronic devices, and are increasingly being used in larger-scale systems such as hybrid and electric vehicles and power generation systems. However, attempts to scale lithium-ion battery technology to these larger applications has exposed a number of problems.

First, the cost of lithium is high compared to conventional nickel, cadmium and lead based battery technologies, and these costs are magnified for larger sized batteries. Thus, there is a need for reducing or eliminating the about of lithium used in the battery. The relatively low proven reserves of lithium in the United States may also limit Li-based battery development and production in that country.

Second, there are safety concerns with some types of lithium battery technology that may be more prone to explosions and fires when scaled to larger sizes. For example, lithium-based batteries that use lithium-cobalt ($LiCoO_2$) cathodes can sometimes experience a release of oxygen during intense and/or frequent electrical charging and discharging cycles. The released oxygen is combustible, and can react with other components in the battery to create a fire or explosion.

Partly in response to the safety concerns with lithium-cobalt technology, other lithium-based materials have been examined for battery applications. One of these compounds is lithium iron phosphate ($LiFePO_4$). However, bulk $LiFePO_4$ has proven to have relatively slow mass and charge transport properties, resulting in relatively poor battery power output. Sol-gel processes used to make $LiFePO_4$ materials for batteries are also inefficient and expensive, further increasing the cost of these batteries. Thus, there is a need for new approaches to making Li-based batteries and their components with improved performance and reduced cost.

BRIEF SUMMARY OF THE INVENTION

Materials are described that can improve the performance and reduce the cost of Li-based batteries. These materials include glass-fibers that can be fashioned into a non-woven mat that acts as a substrate for Li-containing nanoparticles. The mat provides strong, dimensionally-stable, a high-surface area scaffold for the nanoparticles, which provides a large surface area of active sites while reducing the amount of lithium left in the bulk. This means less lithium is required for an equivalent energy density, power density, etc., than used in conventional Li-ion materials. They may also enhance the mass and charge transport properties of Li-based compounds such as $LiFePO_4$.

Also described are sodium glass fibers that may eliminate the need for lithium altogether in specific battery components such as the cathode electrode. Sodium-based compounds such as sodium iron flourophosphate ($Na_2FePO_4F$) have been discovered that have ion transport rates comparable or exceeding Li-based compounds. Some of these sodium-based compounds can be incorporated into sodium glass fibers, which makes the fibers themselves the active material for ion transport and eliminates the need for additional nanoparticles to be added (although there is no prohibition against adding nanoparticles, which in some instances may further enhance the material's performance). These sodium glass fibers may be used to make a lithium free cathode.

Embodiments of the invention include glass-fiber composites that include a substrate containing glass fibers and particles in contact with the glass fiber substrate. The particles may include an alkali-metal containing compound, such as a lithium-containing compound. The glass fibers may include a sodium-based compound.

Embodiments of the invention further include substrates having glass fibers made from sodium-containing materials, such as $Na_2FePO_4F$. The glass fibers may be microfibers and/or nanofibers.

Embodiments of the invention may also include batteries having an anode, a cathode, and an electrolyte. The cathode may include alkali-metal containing nanoparticles in contact with glass fibers. The glass fibers may include a sodium-based compound.

Embodiments of the invention may also further include batteries having a cathode that includes glass microfibers which include $Na_2FePO_4F$. Embodiments may include batteries having a cathode that includes glass fibers which include a sodium-based compound.

Embodiments of the invention may still further include methods of making a glass-fiber composite. The methods may include the steps of forming a wet laid non-woven glass fiber substrate, and contacting alkali-metal containing particles on the substrate. The glass fiber substrate may include a sodium-based compound.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

Glass fiber composites are described that may be used as electrodes in electrical storage batteries, among other devices and applications. Examples of the composites include non-woven glass microfibers that provide a durable, dimensionally stable, microporous substrate for alkali-metal containing nanoparticles, such as lithium and/or sodium-containing nanoparticles. Specific examples of these nanoparticles may include lithium iron phosphate ($LiFePO_4$), sodium iron fluorophosphate ($Na_2FePO_4F$) nanoparticles, and other sodium-containing nanoparticles described herein.

Also described are glass fiber substrates made from glass fibers that incorporate sodium iron fluorophosphates. Making the glass fibers out of $Na_2FePO_4F$ may obviate the need to introduce nanoparticles to the fibers when forming an electrode. These fibers may have micro- and/or nano-sized diameters that are similar or the same as the scale of the nanoparticles.

Glass fiber substrates may include a sodium compound. A sodium compound may include a sodium metal oxide, a sodium phosphate, a sodium sulfate, a sodium cyanide, or a derivative thereof, or a mixture thereof. The metal in the sodium metal oxide may be a transition metal. The metal in the sodium metal oxide may include two different metal atoms. The metal in the sodium compound may have an oxidation state of +2. Examples of a sodium compound may include $NaMnO_2$, $NaNiO_2$, $Na(Ni_{0.5}Mn_{0.5})O_2$, $NaFePO_4$, $Na_2Fe_2(SO_4)_3$, and $Na_2Mn^{II}[Mn^{II}(CN)_6]$. The glass fiber substrate may exclude any compound or group of compounds described herein.

The composites may be made by combining a wet laid non-woven gas-fiber substrate with the nanoparticles. The nanoparticles may be introduced to the substrate by among other methods, coating, embedding, or saturating the nanoparticles in the substrate. Nanoparticles may include sodium compounds. The nanoparticles may include a sodium metal oxide, a sodium phosphate, a sodium sulfate, a sodium cyanide, a derivative thereof, or a mixture thereof. The metal in the sodium metal oxide may be a transition metal. The metal in the sodium metal oxide may include two different metal atoms. The metal in the sodium compound may have an oxidation state of +2. Examples of a sodium compound may include $NaMnO_2$, $NaNiO_2$, $Na(Ni_{0.5}Mn_{0.5})O_2$, $NaFePO_4$, $Na_2Fe_2(SO_4)_3$, and $Na_2Mn^{II}[Mn^{II}(CN)_6]$. The nanoparticle may exclude any compound or group of compounds described herein.

Both the above-described materials may be formed into a cathode electrode of an electrical storage battery. The cathode may be separated from the anode electrode by an electrolyte. The electrolyte may be, for example, a microporous separator membrane that contains $LiPF_6$, and the anode electrode may be a metallic anode such as a lithium metal anode or an alloy of two or more metals.

Structural cathodes made from the composite materials have increased surface area for holding the nanoparticles, and may be incorporated into larger, more reliable cells having reduced winding costs. The high-surface area glass fiber substrates may include substrates with surface areas ranging from about 20 $m^2/g$ to about 300 $m^2/g$ or more.

Increasing the accessible surface area of the cathode can increase the ion mass transfer through the cathode as well as the total energy density of the cathode and battery. The present cathodes may include hierarchically porous structures that combine micro- and nanoscale pores to increase the structural integrity and surface area of the cathode material. Batteries that include the present cathodes may achieve power outputs of 760 W/kg or more, and energy densities of about 100 mAh/g or more. The batteries can also have improved cycle performance with losses of about 3% or less over about 700 cycles.

The composite materials have high-surface area produced by forming the glass mircofibers and/or nanofibers into strong, durable, non-woven mats. The fiberglass mats may be fashioned into a micro- and/or nanoporous substrate. They may provide improved mechanical and thermal properties, as well as improved dimensional stability during electrical charging and discharging. This can increase the overall life span of batteries made with these materials. The increased strength of these composite materials also allows more rapid winding of cells and can increase the size of the cells, both of which can lower manufacturing costs of the batteries.

Batteries made with the present glass fiber materials (either with or without nanoparticles) may have a number of advantages over current lithium-ion battery technology. These advantages may include:

Specific Energy Density (Wh/kg)—The present batteries can meet or exceed about 200 Wh/kg (system) and about 400 Wh/kg (cell).

Volumetric Energy Density (Wh/l)—The increased strength provided by the glass fiber substrate allow tighter packing of the battery electrodes and separator. The nanoporous electrodes allow the electrolyte to penetrate into the electrodes, thus creating an efficient utilization of space. Sodium glass (e.g., $Na_2FePO_4F$) cathodes may have a lower intrinsic power density than cathodes using lithium-containing nanoparticles, but because active areas of the sodium glass cathodes include the fibers themselves, there is less inactive area for these cathodes.

System Cost (kWh/$)—For sodium glass cathodes, cost reductions may be realized due to the decreased use of lithium. These cathodes can reduce costs to about US$250/kWh or less. For cathodes that include Li-containing nanoparticles cost reductions of about 20% to about 40% compared to conventional Li-ion batteries may be realized from the reduction in cell windings and increased cell size.

Specific Power Density (W/kg)—Nanoscale systems can increase power density at high discharge rates owing to their increased ion mass transfer. The present batteries may have power densities of about 760 W/kg and energy density of about 100 mAh/g. The present materials may also be incorporated into system features such as ultracapacitors that can boost power in pulses.

Volumetric Power Density (WA)—Cathodes made from the present materials can have improved high-drain performance.

Cycle Life (#)—Batteries may achieve about 1000 or more cycles. Binding materials and techniques are employed to reduce the unbinding of nanoparticles from the glass-fiber substrate in those embodiments where nanoparticles are used. For sodium-glass cathodes that do not have bound nanoparticles, even larger numbers of cycles may be achieved.

Round Trip Efficiency—The present batteries may have discharge capacity losses of about 3% or less over 700 cycles at a rate of 1.5 C. At C/3, the capacity loss may be significantly lower.

Temperature Tolerance—The present composites, substrates, cathodes, and batteries may have maximum operating temperatures of about 65° C. or more.

Self Discharge—The present materials may be optimized to reduce the self discharge rate to what is comparable in conventional Li-ion batteries.

Safety—The present materials include phosphate containing active electrode materials. Phosphates ($—PO_4$) typically have more tightly bound oxygen groups than other conventional electrode materials (e.g., $LiCoO_2$). This reduces the risk of oxygen liberation that can contribute to fires and explosions in the phosphate-containing batteries and systems. The strength and stability of the glass-fiber substrate can also reduce the incidents of short circuits in the battery and other catastrophic failure modes.

Calendar Life (Years)—The glass fiber substrates do not interfere with battery operation and iron-phosphate systems have significantly lower degradation rates than conventional Li-ion batteries and systems. The present batteries may have an increased lifetime compared to the average lifetime for a conventional system.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of making a glass-fiber composite, the method comprising the steps of:
   forming a wet laid non-woven glass fiber substrate, wherein the glass fiber substrate comprises a sodium-based compound selected from the group consisting of $NaMnO_2$; $NaNiO_2$; $Na(Ni_{0.5}Mn_{0.5})O_2$, $NaFePO_4$, $Na_2Fe_2(SO_4)_3$, and $Na_2Mn^{II}[Mn^{II}(CN)_6]$; and contacting alkali-metal containing particles on the substrate.

2. The method of claim 1, wherein the contacting of the alkali-metal containing particles on the substrate comprises coating, embedding, or saturating the substrate with the particles.

3. The method of claim 1, wherein the sodium-based compound is selected from the group consisting of $NaNiO_2$, $Na(Ni_{0.5}Mn_{0.5})O_2$, $NaFePO_4$, $Na_2Fe_2(SO_4)_3$, and $Na_2Mn^{II}[Mn^{II}(CN)_6]$.

4. A glass fiber substrate comprising glass fibers that comprise a sodium-based compound selected from the group consisting of $NaNiO_2$, $Na(Ni_{0.5}Mn_{0.5})O_2$, $NaFePO_4$, $Na_2Fe_2(SO_4)_3$, and $Na_2Mn^{II}[Mn^{II}(CN)_6]$.

5. The glass fiber substrate of claim 4, wherein the glass fibers comprise nanofibers.

6. A glass-fiber composite comprising:
   a substrate comprising glass fibers, wherein the glass fibers comprise a sodium-based compound selected from the group consisting of $NaMnO_2$, $NaNiO_2$, $Na(Ni_{0.5}Mn_{0.5})O_2$, $NaFePO_4$, $Na_2Fe_2(SO_4)_3$, and $Na_2Mn^{II}[Mn^{II}(CN)_6]$; and
   particles in contact with the substrate, wherein the particles comprise an alkali-metal containing compound.

7. The composite of claim 1, wherein the glass fibers comprise non-woven glass microfibers.

8. The composite of claim 1, wherein the alkali-metal containing compound comprises a lithium-containing compound or a sodium-containing compound.

9. The composite of claim 1, wherein the alkali-metal containing compound comprises $LiFePO_4$.

10. The composite of claim 6, wherein the composite comprises a cathode of a battery.

11. The composite of claim 1, wherein the sodium-based compound is selected from the group consisting of $NaNiO_2$, $Na(Ni_{0.5}Mn_{0.5})O_2$, $NaFePO_4$, $Na_2Fe_2(SO_4)_3$, and $Na_2Mn^{II}[Mn^{II}(CN)_6]$.

12. The composite of claim 1, wherein the substrate has a surface area ranging from about 20 $m^2/g$ to about 300 $m^2/g$.

13. The composite of claim 1, wherein:
   the glass-fiber composite is formed by coating, embedding, or saturating the substrate with the particles, and
   the particles comprise nanoparticles.

14. The composite of claim 13, wherein the glass-fiber composite is formed by embedding the substrate with the particles.

15. A battery comprising:
   an anode;
   a cathode that includes glass fibers comprising a sodium-based compound selected from the group consisting of $NaMnO_2$, $NaNiO_2$, $Na(Ni_{0.5}Mn_{0.5})O_2$, $NaFePO_4$, $Na_2Fe_2(SO_4)_3$, and $Na_2Mn^{II}[Mn^{II}(CN)_6]$; an electrolyte; and
   a separator.

16. The battery of claim 15, wherein the cathode comprises lithium-containing nanoparticles in contact with the glass fibers.

17. The battery of claim 15, wherein the cathode comprises sodium-containing nanoparticles in contact with the glass fibers.

18. The battery of claim 15, wherein the electrolyte comprises $LiPF_6$.

19. The battery of claim 15, wherein the glass fibers comprise glass nanofibers.

20. The battery of claim 15, wherein the sodium-based compound is selected from the group consisting of $NaNiO_2$, $Na(Ni_{0.5}Mn_{0.5})O_2$, $NaFePO_4$, $Na_2Fe_2(SO_4)_3$, and $Na_2Mn^{II}[Mn^{II}(CN)_6]$.

21. The battery of claim 15, wherein the separator comprises a porous membrane.

* * * * *